United States Patent
Liu et al.

(10) Patent No.: US 8,666,422 B2
(45) Date of Patent: Mar. 4, 2014

(54) METHOD AND APPARATUS FOR SETTING A TRANSMIT POWER LEVEL

(75) Inventors: Yajian Liu, Ipswich (GB); John Yearsley Bromell, Saffron Walden (GB); Akhilesh Pokhariyal, Richmond (GB); David Neil, Cambridge (GB)

(73) Assignee: IP.Access Limited, Cambourne, Cambridgeshire (GB)

( * ) Notice: Subject to any disclaimer, the term of this patent is extended or adjusted under 35 U.S.C. 154(b) by 0 days.

(21) Appl. No.: 13/121,365

(22) PCT Filed: Jun. 25, 2009

(86) PCT No.: PCT/EP2009/057982
§ 371 (c)(1),
(2), (4) Date: Oct. 12, 2011

(87) PCT Pub. No.: WO2010/037571
PCT Pub. Date: Apr. 8, 2010

(65) Prior Publication Data
US 2012/0028629 A1     Feb. 2, 2012

(30) Foreign Application Priority Data
Sep. 30, 2008    (GB) .................................. 0817792.5

(51) Int. Cl.
*H04W 40/00*      (2009.01)
*H04W 36/00*      (2009.01)

(52) U.S. Cl.
USPC .......................................... 455/449; 455/443

(58) Field of Classification Search
USPC ......... 455/449, 343, 509, 433, 522, 525, 446, 455/422.1; 370/311, 328, 329
See application file for complete search history.

(56) References Cited

U.S. PATENT DOCUMENTS

| | | | |
|---|---|---|---|
| 2003/0091028 A1* | 5/2003 | Chang et al. | 370/352 |
| 2004/0242257 A1* | 12/2004 | Valkealahti et al. | 455/522 |
| 2004/0252669 A1* | 12/2004 | Hosein | 370/342 |
| 2008/0212554 A1* | 9/2008 | Mun et al. | 370/343 |

FOREIGN PATENT DOCUMENTS

| | | |
|---|---|---|
| EP | 1455549 | 9/2004 |
| EP | 1892847 | 2/2008 |
| GB | 2445990 | 7/2008 |
| WO | 9912275 | 11/1999 |
| WO | 2008098898 | 8/2008 |

OTHER PUBLICATIONS

Ericsson: "UE measurements and reporting of global cell identity" 3GPP Draft; R2-074097, 3rd Generation Partnership Project (3GPP), Mobile Competence Centre; vol. RAN WG2, No. Shanghai China 20071008, Oct. 1, 2007.
United Kingdom Search Report for Application No. GB 0817792.5, dated Dec. 29, 2008.
International Search Report dated Sep. 22, 2009.
Chinese Third Office Action Dated Oct. 29, 2013 from Chinese Application for Invention No. 200980138059.4.

* cited by examiner

*Primary Examiner* — Michael Faragalla
(74) *Attorney, Agent, or Firm* — Fitch Even Tabin & Flannery LLP

(57) ABSTRACT

An access point for supporting communication in a femto cell of a cellular communication network. The access point comprises transceiver circuitry arranged to enable communication with at least one cell subscribed wireless communication unit located within the femto cell, and signal processing logic module. The signal processing logic is arranged to configure a transmit power level of a Common Pilot CHannel (CPICH) for transmission based at least on cell subscribed wireless communication unit information.

23 Claims, 8 Drawing Sheets

METHOD AND APPARATUS FOR SETTING A TRANSMIT POWER LEVEL

CROSS REFERENCE TO RELATED APPLICATIONS

This application is a national phase application of International Application No. PCT/EP2009/057982, filed Jun. 25, 2009, claiming priority to Great Britain Application No. 0817792.5, filed Sep. 30, 2008, both of which are incorporated by reference herein in their entirety.

FIELD OF THE INVENTION

The field of the invention relates to a method and apparatus for setting a transmit power level, and in particular to a method and apparatus for setting a transmit power level of a Common Pilot CHannel (CPICH) for a femto cell of a cellular communication network.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3qpp.orq).

Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network.

The $3^{rd}$ generation of wireless communications has been developed for macro-cell mobile phone communications. Such macro cells utilise high power base stations (NodeBs in 3GPP parlance) to communicate with UEs within a relatively large coverage area.

Lower power (and therefore smaller coverage area) femto cells or pico-cells are a recent development within the field of wireless cellular communication systems. Femto cells or pico-cells (with the term femto cells being used hereafter to encompass pico-cells or similar) are effectively communication coverage areas supported by low power base stations (otherwise referred to as Access Points (APs)). These femto cells are intended to be able to be piggy-backed onto the more widely used macro-cellular network and support communications to UEs in a restricted, for example 'in-building', environment.

In this regard, a femto cell that is intended to support communications according to the 3GPP standard will hereinafter be referred to as a 3G femto cell. Similarly, an access controller intended to support communications with a low power base station in a 3G femto cell will hereinafter be referred to as a $3^{rd}$ generation access controller (3G AC). Similarly, an Access Point intended to support communications in a femto cell according to the 3GPP standard will hereinafter be referred to as a $3^{rd}$ Generation Access Point (3G AP).

Typical applications for such 3G APs include, by way of example, residential and commercial (e.g. office) locations, 'hotspots', etc, whereby an AP can be connected to a core network via, for example, the Internet using a broadband connection or the like. In this manner, femto cells can be provided in a simple, scalable deployment in specific in-building locations where, for example, network congestion at the macro-cell level may be problematic.

As will be appreciated by a skilled artisan, in a large scale deployment, there can be as many as a few million femto cells interspersed within the macro cellular layer. In a co-channel deployment in particular, interference from femto cells becomes a major problem for macro cell receivers. Noise experienced by the macro cell receivers, caused by interference from femto APs and wireless communication units within femto cells, leads to a reduction in the effective coverage area for that macro cell.

As is known, within each cell of, say, a UMTS network, a Common Pilot CHannel (CPICH) is broadcast by the base station (e.g. Node B or femto AP) for that cell. The CPICH comprises a known bit sequence that can be discovered by User Equipment (UE) within the cell as a phase reference for other channels and to obtain measurements for that cell.

Typically, a CPICH is broadcast with a transmit power of around 10% of the total available transmit power for that cell. The transmit powers of other common control channels and HS-PDSCHs are normally set to be proportional to CPICH transmit power. As a result, if CPICH transmit power of a femto cell can be properly controlled to a lower level, the interference experienced by neighbouring cells, such as overlapping macro cells, can be significantly reduced. However, as previously mentioned, the CPICH is used by UEs as a phase reference for other channels and to obtain measurements for that cell. Consequently, the transmit power of the CPICH directly affects the coverage of a cell. Accordingly, whilst reducing the transmit power of the CPICH may reduce the interference caused by that cell to neighbouring cells, it also reduces the effective coverage area of the cell.

For example, networked controlled cell breathing is a known load-handling scheme based on dynamic cell coverage adjustment implemented within macro cells. When a macro cell becomes heavily loaded, it becomes more difficult to maintain a particular quality of service, especially for users that are located towards the edge of the cell. Network controlled cell breathing involves changing one or more parameters, for example the CPICH transmit power or the maximum propagation loss allowed for users in the cell, in such a way as to reduce the effective cell coverage area. In this manner, user traffic at the periphery of the macro cell is forced to move to neighbouring cells that are more lightly loaded. Once the cell load drops, the cell coverage area can be increased again.

As will be appreciated by a skilled artisan, in the case of femto cells, where typically only cell subscribed users may be permitted to access services via the femto cell, cell loading may be more easily controlled by way of limiting the number of cell subscribed users, and/or enabling/disabling cell subscribed users. Thus, network controlled cell breathing schemes as used in macro networks are not appropriate for femto cells, and thus are only implemented within macro cells, where the reduction in the effective coverage area (e.g. by reducing the transmit power of physical channels, such as the CPICH) to force users to be redirected to neighbouring cells, is not problematic, and indeed is advantageous. However, this does not translate to femto cells, where management of interference to the macro network and effective coverage to cell-subscribed users are of greater importance than load handling.

Conventionally, the CPICH power of a Node B is configured according to network and cell planning, and in particular according to a required cell coverage area. However, due to the more ad hoc nature in which femto cells may be deployed, such cell planning is not feasible for femto APs. It is therefore proposed that a femto AP is able to scan for, receive, and measure transmissions from base stations, including macro cell and other femto cell base stations, in a manner that is termed Network Listen. Some recent proposals for setting the CPICH power of a femto AP comprise adaptively adjusting the CPICH power for the femto AP based on information about neighbouring cells obtained using Network Listen. Whilst such approaches may help to reduce inter-cell interference, they do not take into account user or UE information or requirements. Consequently, such approaches can have a detrimental effect on the quality of services provided to UEs.

Another problem that has been identified with femto cells is that, due to the problem of interference caused by femto cells to, for example, overlapping/neighbouring macro cells, it is desirable to keep the overall available transmission power of the femto AP to within a constrained level. As a result, femto APs typically have a limited amount of power available for use for physical channels. When a large number of users require services from the femto AP, the power available for providing each service can become significantly low, thereby affecting the quality of service that is provided to the UEs.

Thus, there exists a need for an apparatus and a method for setting transmit power levels that substantially alleviates at least some of the deficiencies with current techniques and methods therefor.

SUMMARY OF THE INVENTION

Accordingly, the invention seeks to mitigate, alleviate or eliminate one or more of the abovementioned disadvantages singly or in any combination.

According to a first aspect of the invention, there is provided an access point for supporting communication in a femto cell of a cellular communication network. The access point comprises transceiver circuitry arranged to enable communication with at least one cell-subscribed wireless communication unit located within the femto cell, and signal processing logic module. The signal processing logic module is arranged to determine a number of cell-subscribed wireless communication units that are identified as being allowed to use a user service provided in the femto cell; determine a number of those identified cell-subscribed wireless communication units that are present within the femto cell and configure a transmit power level of a Common Pilot CHannel (CPICH) based thereon.

In this manner, the transmit power level, and thereby the interference caused thereby, can be reduced, whilst maintaining an effective quality of services to the cell-subscribed wireless communication units within the femto cell.

According to a second aspect of the invention, there is provided a method for setting a transmit power level of a Common Pilot CHannel (CPICH) for a femto cell of a cellular communication network. The method comprises steps according to the first aspect of the invention.

According to a third aspect of the invention, there is provided a wireless communication system adapted to support the aforementioned method for setting a transmit power level of a Common Pilot CHannel (CPICH) for a femto cell of a cellular communication network. According to a fourth aspect of the invention, there is provided a computer-readable storage element having computer-readable code stored thereon for programming a signal processing logic module to perform the aforementioned method.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
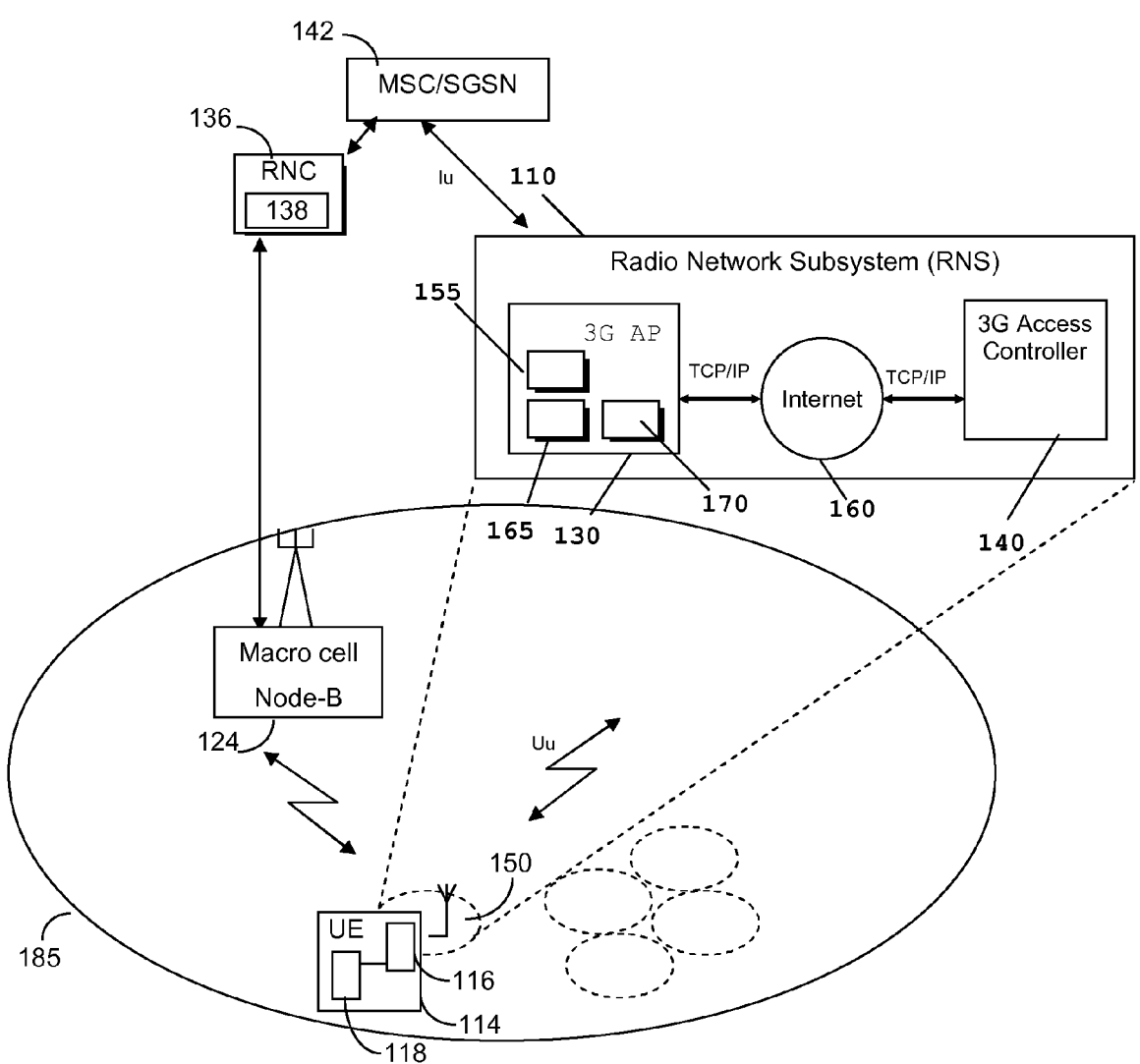
FIG. 1 illustrates an example of part of a cellular communication network adapted in accordance with an embodiment of the invention.

Referring now to the drawings, and in particular FIG. 1, an example of part of a 3GPP network, adapted in accordance with an embodiment of the invention, is illustrated and indicated generally at 100. In FIG. 1, there is illustrated an example of a communication system 100 that comprises a combination of a macro cell 185 and a plurality of 3G femto cells 150 in accordance with one embodiment of the invention. For the embodiment illustrated in FIG. 1, the radio network sub-system (RNS) comprises two distinct architectures to handle the respective macro cell and femto cell communications. In the macro cell scenario, the RNS comprises a controller in the form of a Radio Network Controller (RNC) 136 having, inter alia, signal processing logic 138. The RNC 136 is operably coupled to a Node B 124 for supporting communications within the macro cell 185. The RNC 136 is further operably coupled to a core network element 142, such as a serving GPRS support node (SGSN)/mobile switching centre (MSC), as known.

In a femto cell scenario, an RNS 110 comprises a network element, in a form of an 3G Access Point (3G AP) 130, performing a number of functions generally associated with a base station, and a controller in a form of a 3G Access controller (3G AC) 140. As will be appreciated by a skilled artisan, a 3G Access Point is a communication element that supports communications within a communication cell, such as a 3G femto cell 150, and as such provides access to a cellular communication network via the 3G femto cell 150. One envisaged application is that a 3G AP 130 may be purchased by a member of the public and installed in their home. The 3G AP 130 may then be connected to a 3G AC 140 over the owner's broadband internet connection 160.

Thus, a 3G AP 130 may be considered as encompassing a scalable, multi-channel, two-way communication device that may be provided within, say, residential and commercial (e.g. office) locations, 'hotspots' etc, to extend or improve upon network coverage within those locations. Although there are no standard criteria for the functional components of a 3G AP, an example of a typical 3G AP for use within a 3GPP system may comprise some Node-B functionality and some aspects of radio network controller (RNC) 136 functionality. For the illustrated embodiment, the 3G AP 130 further comprises transceiver circuitry 155 arranged to enable communication with one or more wireless communication units located within the general vicinity of the communication cell, and in particular within the communication cell 150, such as User Equipment (UE) 114, via a wireless interface (Uu).

The 3G Access Controller 140 may be coupled to the core network (CN) 142 via an Iu interface, as shown. In this manner, the 3G AP 130 is able to provide voice and data services to a cellular handset, such as UE 114, in a femto cell in contrast to the macro cell, in the same way as a conventional Node-B, but with the deployment simplicity of, for example, a Wireless Local Area Network (WLAN) access point.

The UE 114 is a wireless communication unit comprising a transceiver 116 arranged to transmit and receive signals, and signal processing logic module 118. As would be appreciated by a skilled person, UE 114 comprises numerous other functional and logical elements to support wireless communications and functionality and which will not be described further herein.

The 3G AP 130 of FIG. 1 further comprises signal processing logic module 165. The signal processing logic module 165 is arranged to configure a transmit power level of a Common Pilot CHannel (CPICH) based at least on cell-subscribed wireless communication unit information.

For clarity, the term 'cell-subscribed' used herein refers to other wireless communication units, such as UEs, that have subscribed to, or otherwise been registered with, the particular cell, and are thereby authorised to access services from that cell. For example, the femto AP 130 may comprise a table of identities for cell subscribed UEs, and whenever a UE attempts to join the femto cell 150, where communications are supported by that femto AP 130, the identity of that UE is checked to determine whether it is authorised to access services (with the possible exception of emergency services) via that cell. If the UE is not a cell subscribed UE, it is refused a connection. The specific mechanisms and techniques for implementing such a subscription capability are known, and accordingly will not be described in further detail herein. For example, one approach to UEs becoming subscribed to a particular femto cell may comprise a Network Operator providing a website that allows the owner of the femto AP for that cell to specify a list of telephone numbers that are allowed to use the femto cell. These phone numbers may then be automatically converted into International Mobile Subscriber Identities (IMSIs) and pushed down as subscription configuration data to the appropriate femto AP.

As will be appreciated by a skilled artisan, typically for known macro and femto cells, at least within UMTS and similar cellular networks, the CPICH transmit power typically uses around 10% of a cell's total available transmit power and, thus, is a significant contributor to inter-cell interference caused by femto cells. Thus, by configuring the transmit power level of the CPICH for the cell based on subscribed UE information, the signal processing logic module 165 is able to adapt the CPICH transmit power accordingly, for example to reduce the CPICH transmit power, whilst substantially maintaining the effective quality of services to cell-subscribed UEs within the cell. In particular, when the CPICH transmit power is not required to be around, for example, 10% of the total transmit power for the cell in order to provide an effective quality of services to cell-subscribed users within the cell, it can be reduced to a lower power level that still provides effective quality of services. Accordingly, interference to neighbouring cells, such as neighbouring macro cells, caused by the CPICH may be reduced.

In order to maintain the quality of service provided to a cell-subscribed user, two conditions should be satisfied:

a) the received Signal to Interference Ratio (SIR) value of the corresponding Physical Channel, e.g. Dedicated Physical Channel (DPCH) or High Speed Physical Downlink Shared CHannel (HS-PDSCH), is above a required SIR target (for example derived from a QoS requirement Block Error Rate); and b) the received CPICH quality of the serving cell has to be above the minimum level (e.g. CPICH Ec/N0 must be no less than −20 dB) in order substantially guarantee channel estimation quality.

As will be appreciated by a skilled artisan, in 3G cellular systems, the transmit power for other control channels and High Speed Downlink Packet Access (HSDPA) channels are set relative to the primary CPICH transmit power. Accordingly, modifying the transmit power level of the CPICH based on cell-subscribed wireless communication unit information may also have the effect of modifying other control channels and HSDPA channels. As a result, not only may the CPICH transmit power be reduced, but also that of additional channels, thereby further reducing interference to neighbouring cells. In particular, as previously mentioned, the CPICH transmit power may comprise up to around 10% of the total transmit power available. Other common control channels may utilise up to a further 10% of the total available transmit power, whilst HSDPA channels may utilise up to 60% of the total transmit power. Thus, by reducing the transmit power of the CPICH, the transmit power for the other common control channels and HSDPA channels will in turn be reduced, thereby providing a significant overall reduction in power transmitted within the femto cell, and thus providing significant reductions in the interference to neighbouring cells.

In accordance with some embodiments of the invention, the signal processing logic module 165 may be arranged to configure the transmit power level of the CPICH based on CPICH quality measurements received from at least one cell subscribed wireless communication unit, such as UE 118, located within the femto cell 150.

In particular, the signal processing logic module 165 of femto AP 130 may be arranged to instruct cell-subscribed wireless communication units, such as UE 118, within the femto cell 150 to report CPICH quality measurements to the femto AP 130. Upon receipt of the CPICH quality measurements from at least one cell-subscribed wireless communication unit, the signal processing logic module 165 may be arranged to configure the transmit power level of the CPICH based on the received CPICH quality measurements.

For example, as is known in the art, within a UMTS network CPICH power levels are broadcast to UEs. In this manner, a UE is able to read the broadcast power level of the CPICH (Io), and to compare this to a measured power level of the CPICH (Ec). Based on this comparison, the UE is able to determine path loss measurements between the UE and, in the case of a femto cell, the femto AP, for example in a form of a ratio Ec/Io. Thus, the signal processing logic module 165 may instruct the UE to report such path loss measurements. Alternatively, the signal processing logic module 165 may instruct the UE to report the power level measurements (Ec) themselves.

In accordance with some embodiments of the invention, the signal processing logic module 165 may be further arranged to determine a cell-subscribed wireless communication unit coverage area based on the cell-subscribed wireless communication unit information, and to configure the transmit power level of the CPICH to substantially correspond to the determined cell subscribed wireless communication unit coverage area.

Figure 2:
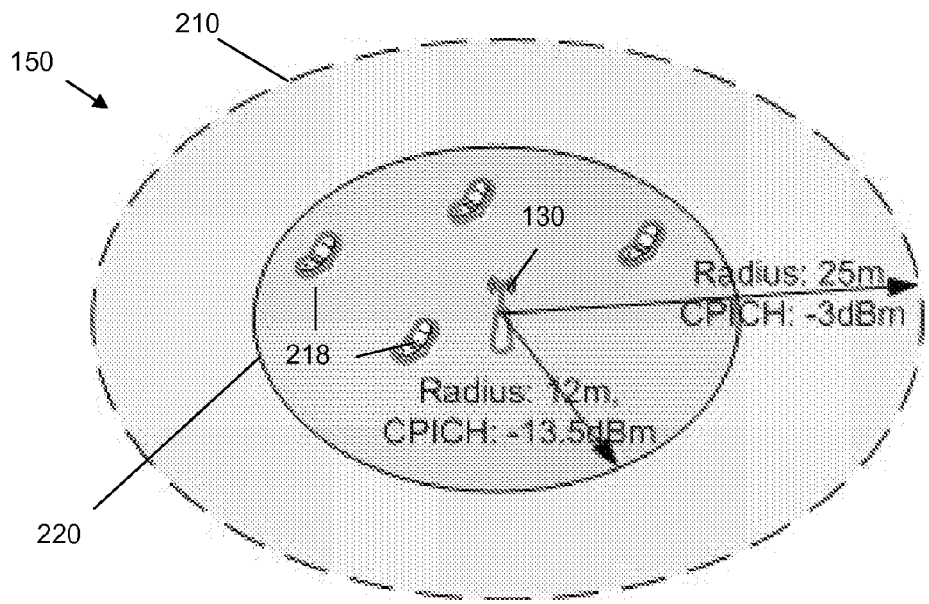
FIGS. 2 to 4 illustrate examples of a femto cell of FIG. 1 adapted according to some embodiments of the invention.

For example, FIG. 2 illustrates an example of a femto cell 150 of FIG. 1 according to an embodiment of the invention. The femto cell 150 may comprise a maximum CPICH transmit power level, for example around −3 dBm, whereby when the AP 130 is configured to broadcast the CPICH with this maximum CPICH transmit power level, the femto cell 150 comprises a maximum coverage area 210 having a radius of, say, approximately 25 metres, as illustrated.

As previously mentioned, signal processing logic module 165 of the AP 130 may be arranged to determine a cell-subscribed wireless communication unit coverage area, such as that illustrated at 220, within which each cell-subscribed wireless communication unit 218 detected within the cell 150 is located. The AP 130 may then be arranged to configure the transmit power level of the CPICH to substantially correspond to the determined cell-subscribed wireless communication unit coverage area 220. In this manner, the transmit power, and thereby the interference caused thereby, can be reduced, whilst maintaining an effective quality of services to the cell-subscribed wireless communication units 218 within the femto cell 150. In particular, for the illustrated embodiment, the cell subscribed wireless communication unit coverage area comprises a radius of 12 m, for which the CPICH transmit power level is only required to be in a region of −13.5 dBm, a power reduction of approximately 90%, or 0.45 mW.

As will be appreciated by a skilled artisan, the values used above are only examples, and that the CPICH transmit power needed to achieve a given coverage area will vary for different environments. However, the general trend illustrated by the above exemplary values is generally representative for most environments, whereby the propagation loss is typically proportional to the distance, raised to a power of approximately '2' to '4'. Thus, when the distance is halved, the needed power will be significantly less than half.

In accordance with some embodiments of the invention, the cell subscribed wireless unit coverage area 220 may be determined based on received CPICH quality measurements received from cell-subscribed wireless communication units within the cell 150. For example, the signal processing logic module 118 of the UE may compare received CPICH quality measurements to entries within a lookup table stored in memory 170, in order to determine a cell-subscribed wireless communication unit coverage area. Alternatively, the signal processing logic module 118 may use an algorithm to determine the cell-subscribed wireless unit coverage area, with the received CPICH quality measurements providing inputs to the algorithm.

The signal processor logic module 165 of the AP 130 may further be arranged to instruct cell-subscribed wireless communication units 218 within the femto cell 150 to inform the signal processing logic module 118 of the UE when CPICH quality measurements pass a threshold, and upon being informed by a cell subscribed wireless communication unit of the CPICH quality measurement passing the threshold, to reconfigure the transmit power level of the CPICH.

Figure 3:
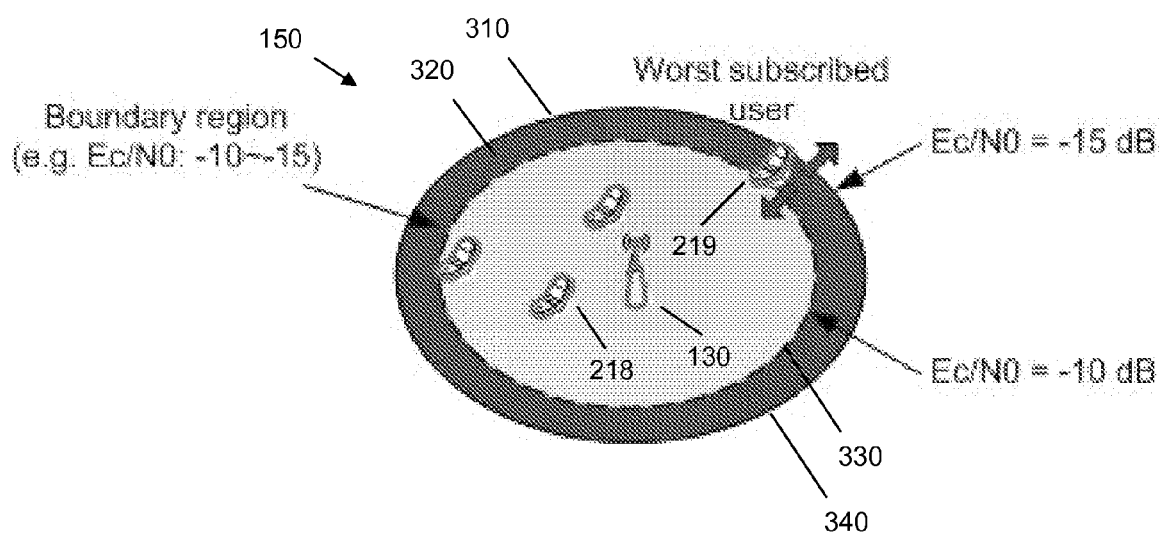

For example, and as illustrated in FIG. 3, the CPICH of the femto cell 150 may by transmitted at a transmit power level, such that the femto cell 150 supports a communication coverage area 310 within which each detected cell subscribed wireless communication unit 218, 219 is located. When a cell-subscribed wireless communication unit 219 moves generally away from the AP 130, the CPICH measurements for that wireless communication unit 219, for example, decrease. If the CPICH measurements drop below a threshold, the wireless communication unit 219, as instructed by the AP 130, informs the AP 130 that the CPICH measurement has passed the threshold, and accordingly is within a boundary region 320 of, or leaving the coverage area 310 of, the femto communication cell 150. In this manner, the AP 130 is able to increase the CPICH transmit power level (unless it is already at its maximum level), and so maintain the quality of services for the wireless communication unit 219.

The amount of signalling overhead will, in part, depend on how often a wireless communication unit enters and leaves the boundary region 320. Typically, in an indoor scenario where the mobility of users is not high, the signalling overhead is envisioned to be relatively low. Moreover, signalling overhead may be reduced by enlarging the size of the cell boundary region 320, or the step size used when increasing/decreasing the CPICH transmit power level. For example, as previously mentioned, the boundary region 320 enables wireless communication units to be tracked within the femto cell 150. The boundary region 320 may be characterised by two thresholds in terms of received serving cell CPICH quality (e.g. Ec/N0, or RSCP). Here, an inner threshold, illustrated at 330, is set to, say Ec/N0=−dB, whilst an outer threshold, illustrated at 340, is set to, say, Ec/N0=−15 dB. Cell-subscribed wireless communication units may then be configured to report the following measurement events when inside the boundary region 320 (Ec/N0 is between the inner and outer thresholds):

(i) Ec/N0 drops below the outer threshold (event a1); and
(ii) Ec/N0 rises above the inner threshold (event a2).

In this manner, when a wireless communication unit reports the occurrence of the first event type (event a1), the cell coverage (as well as the boundary region) needs to be expanded (unless they are already at their maximum level).

Conversely, when a wireless communication unit reports the occurrence of the second event type (event a2), and no other cell-subscribed wireless communication units are present within the boundary region 320, the cell coverage (as well as the boundary region) needs to be reduced (unless they are already at their minimum level).

Cell-subscribed wireless communication units whose Ec/N0 is above the inner threshold of the boundary region may be configured to report a measurement event (event b1), where Ec/N0 drops below the inner threshold. In this manner, when such an event (event b1) is reported, the number of cell-subscribed wireless communication units inside the boundary region 320 may be updated, and the new cell-subscribed wireless communication unit may be configured to report the a1 and a2 events mentioned above.

It is contemplated that the size of the boundary region adjustment may be substantially equal to the step size of the CPICH power level adjustment (and thereby the step size of the coverage area adjustment). For example, when the CPICH power level is increased to increase the coverage area by one step size, the outer threshold of the boundary region may become the inner threshold of the boundary region, with a new outer threshold being created. Similarly, when the CPICH power level is decreased to decrease the coverage area by one step size, the inner threshold of the boundary region may become the outer threshold of the boundary region, with a new inner threshold being created.

Alternatively, the step size of the CPICH adjustment (and thereby the step size of the coverage area adjustment) may be smaller than the size of the boundary region. In this case, when the CPICH power level is adjusted, there will be some overlapping of the new boundary region with the old boundary region.

Alternatively still, the step size of the CPICH adjustment (and thereby the step size of the coverage area adjustment) may be larger than the size of the boundary region. In this case, when the CPICH power level is adjusted, there will be a gap between the new boundary region and the old boundary region. However, whilst this approach is suitable for an expanding coverage area, if used for a shrinking coverage area, wireless communication units located within the gap between the old and new boundary regions may become 'lost'.

It is further contemplated that the step size of the CPICH transmit power level adjustments, or the size of the boundary region, may be fixed throughout the range of transmit power levels. Alternatively, the step sizes may vary depending on the particular CPICH transmit power level. For example, when the CPICH power level is low, a larger step size may be used, whilst for a high CPICH power level a smaller step size may be used, or vice versa.

As will be appreciated by a skilled artisan, not all wireless communication units that have subscribed to, or otherwise been registered with, the femto cell 150, may be present within the cell 150 at the same time.

Figure 4:
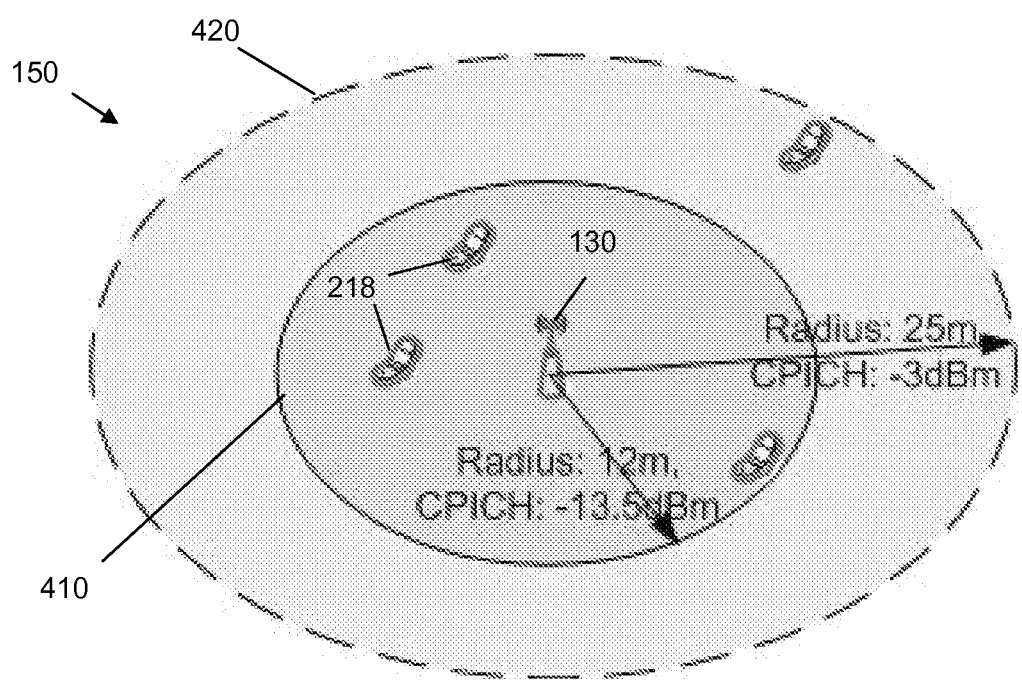

As illustrated in FIG. 4, the CPICH transmit power level may be configured to be transmitted at a maximum allowed transmit power level, for example –3 dBm, thereby resulting in a maximum coverage area 420 of approximately 25 metres for the communication cell 150. Conversely, when the CPICH is configured to be transmitted at a reduced transmit power level, for example of approximately –13.5 dBm, the cell 150 comprises a reduced coverage area 410, for example at approximately 12 metres. Although the reduced CPICH transmit power level may reduce interference to neighbouring cells whilst maintaining the quality of services for cell-subscribed wireless communication units 418 that are present within the cell, it also reduces the coverage range over which the AP 130 is able to detect new wireless communication units approaching the cell. As a result, a wireless communication unit may not be detected until it enters the reduced coverage area 410. If the coverage area 410 is significantly reduced compared to the maximum coverage area 420, the ability of the AP 130 to detect new wireless communication units may be significantly impeded.

Accordingly, the signal processing logic module 165 of the AP 130 may further be arranged to determine whether one or more cell-subscribed wireless communication units are not present within the femto cell 150. Upon determination that at least one cell subscribed wireless communication unit is not present within the femto cell 150, the signal processing logic module 165 may be arranged to temporarily enter a detection mode comprising an increase of the transmit power level of the CPICH upon one or more detection mode criteria being met.

For example, the AP 130 may be arranged to keep track of those wireless communication units that have subscribed to, or otherwise been registered with, the femto cell 150 and are present within the cell 150. If one or more of the wireless communication units subscribed to the cell are not present, the signal processing logic module 165 may be arranged to initiate detection mode upon, for example, one or more of the following events occurring:

(i) Expiration of a period of time since a previous detection mode instance;
(ii) A time of day; or
(iii) The occurrence of one or more predefined events, such as detecting a considerable Rise over Thermal noise (RoT) at the Femto AP, such an increase in RoT indicating the arrival of a wireless communication unit with ongoing calls (through outdoor macro networks) etc.

Furthermore, it is envisaged that different criteria may be used during different periods of the day, and/or during different days of the week/year, to reflect different behavioural patterns at those times.

In this manner, when one or more cell-subscribed wireless communication units are not present within the cell 150, the signal processing logic module 165 periodically, or otherwise, initiates the detection mode, whereby the CPICH power level, and thereby the coverage area, of the cell 150 is increased, increasing the range over which wireless communication units are able to detect the AP 130.

In accordance with an exemplary embodiment of the invention, the AP 130 remains in detection mode for a sufficiently long period of time for a wireless communication unit to at least detect the CPICH, synchronise with the synchronisation channel for the cell, and request a connection to be established with the cell, before exiting the detection mode. In this manner, there is sufficient time for the AP 130 to detect the presence of a wireless communication unit.

If it is determined that no cell-subscribed wireless communication units are present within the femto cell 150, the signal processing logic module 165 may be arranged to configure the transmit power level of the CPICH to a minimum level, for example approximately –25 dBm. In a similar manner to that described above, the signal processing logic module 165 may temporarily enter a detection mode of operation comprising an increase of the transmit power level of the CPICH upon one or more detection mode criteria being met. In this manner, if no cell-subscribed wireless communication units are present within the cell, the CPICH power level may be reduced to a minimum power level (e.g. less than 1% of the maximum power level), or even to zero (for example by powering off the radio completely), minimising interference caused thereby.

In accordance with an embodiment of the invention, upon a previously absent cell-subscribed wireless communication unit being detected within the femto cell, for example during the AP 130 operating in detection mode, the signal processing logic module 165 of the AP 130 may be arranged to instruct the detected wireless communication unit to report CPICH quality measurements to the signal processing logic module 165. Upon receipt of CPICH measurements from the detected wireless communication unit, the signal processing logic module 165 may be arranged to configure the transmit power level of the CPICH taking into account the CPICH measurements received from the detected cell-subscribed wireless communication unit. In this manner, the CPICH transmit power level can be adjusted, if necessary, in order to maintain a quality of service to the detected wireless communication unit.

If a cell-subscribed wireless communication unit has not been present within the cell for, say, a prolonged period of time, such as a week, a month, etc., that wireless communication unit may be considered as 'away', and accordingly not be taken into consideration when determining whether one or more of the cell-subscribed wireless communication units is absent from the cell. For example, that wireless communication unit may be added to a list of 'away' units. If that wireless communication unit is subsequently detected, it may then be removed from the list of 'away' units, and once again be included when determining whether one or more of the cell-subscribed wireless communication units is absent from the cell.

Figure 5:
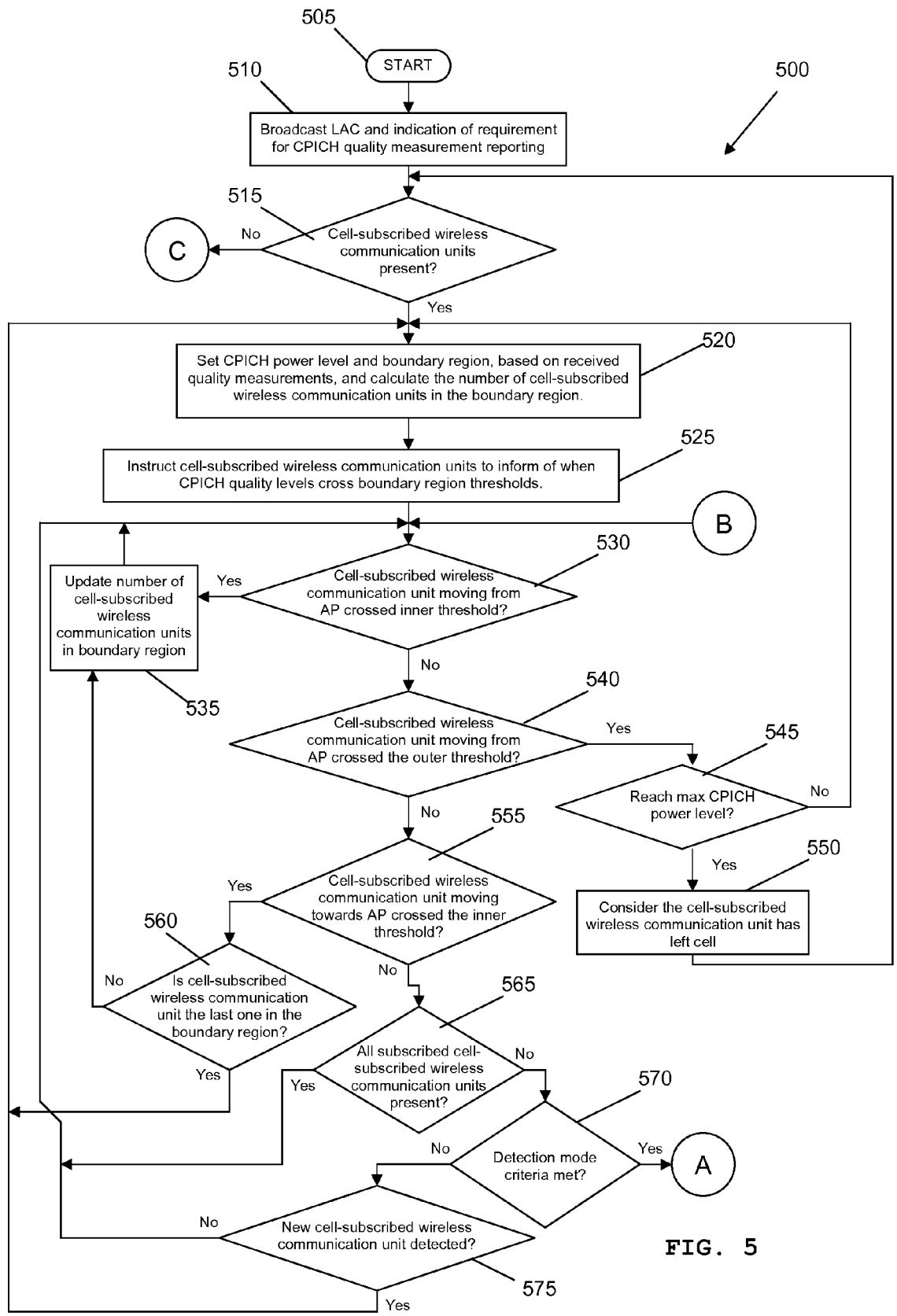
FIGS. 5 to 7 illustrate an example of a simplified flowchart of a method for setting a transmit power level of a Common Pilot Channel (CPICH) for a femto cell of a cellular communication network according to some embodiments of the invention.
Figure 6:
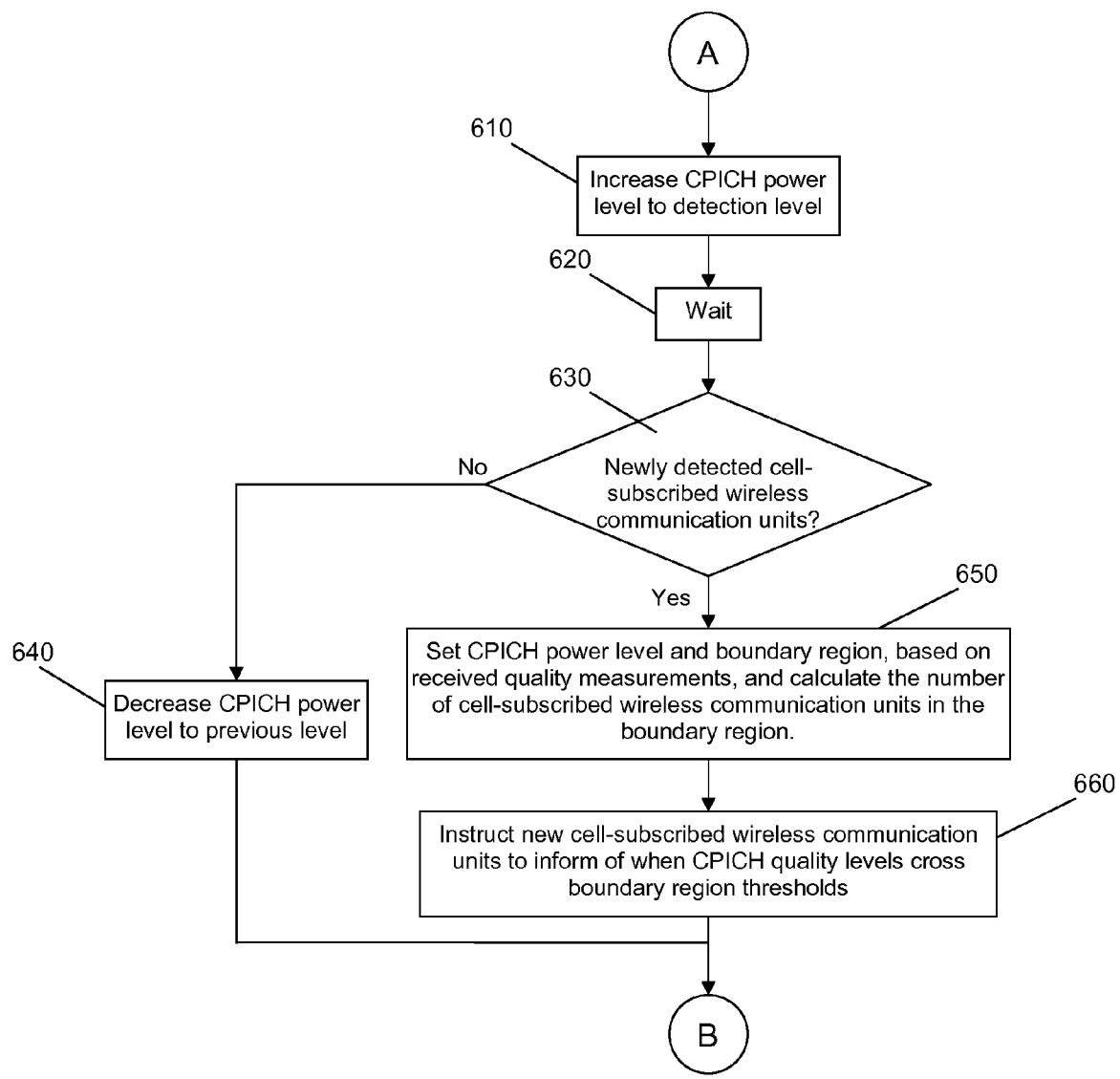
Figure 7:
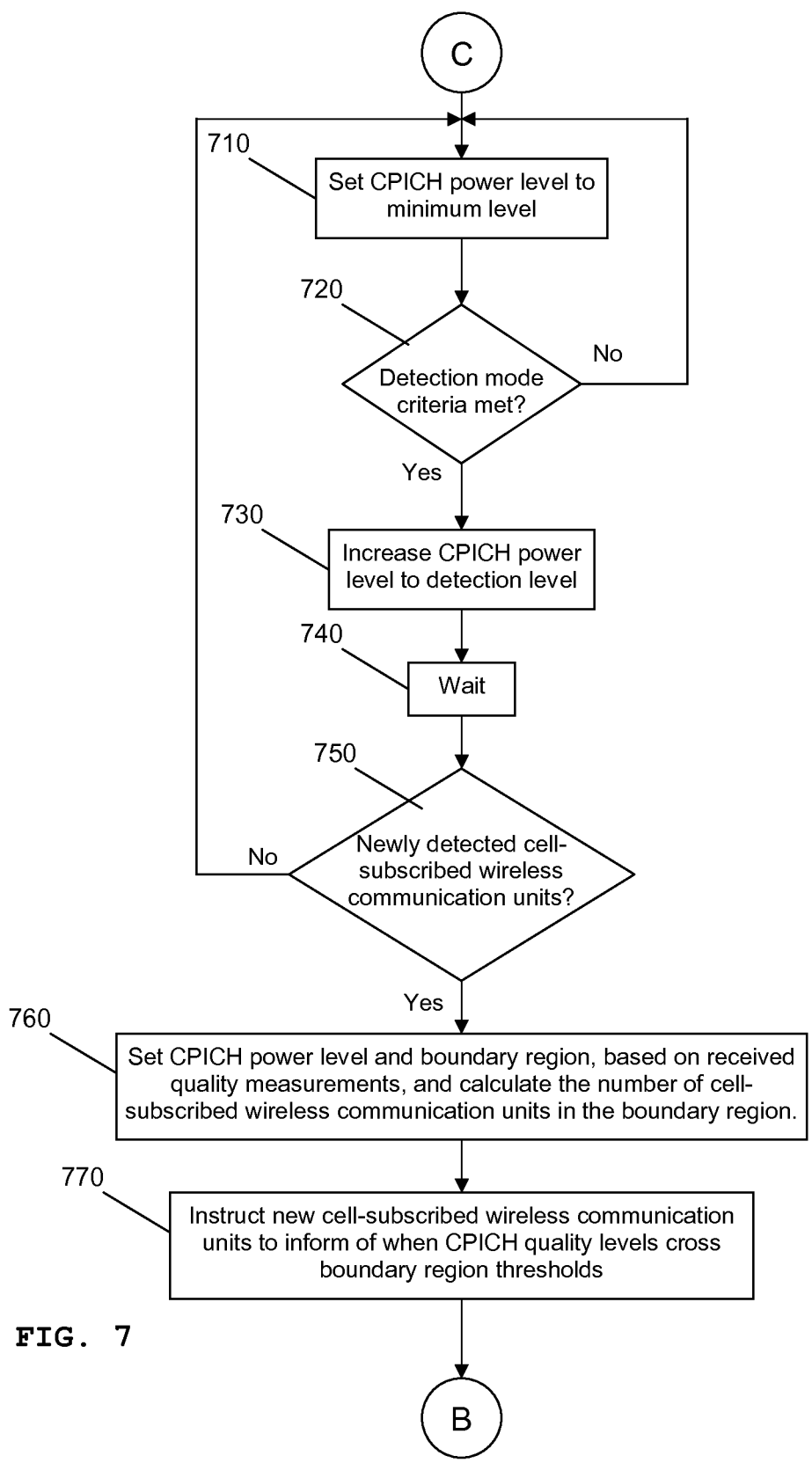

Referring now to FIGS. 5 to 7, there is illustrated an example of a simplified flowchart 500 of a method for setting a transmit power level of a Common Pilot CHannel (CPICH) for a femto cell of a cellular communication network according to some embodiments of the invention, for example as may be implemented by the signal processing logic module 165 of, say, the AP 130 of FIG. 1.

The method starts at step 505, and moves on to step 510 with the broadcasting of a location area code (LAC) for the femto cell, along with an indication of a requirement for CPICH quality measurement reporting. Next, in step 515, it is determined whether cell-subscribed wireless communication units are present within the femto cell. For example, the femto cell may be configured with a different location area code from those of neighbouring cells. In this manner, when a cell-subscribed wireless communication unit enters the cell, it will transmit a location update request, indicating to the femto AP that it is present within the cell. Cell-subscribed wireless communication units entering the cell will also transmit CPICH quality measurements in response to the broadcasting of the requirement for such in step 510.

If cell-subscribed wireless communication units are present within the femto cell, the method moves on to step 520, where the CPICH power level and the boundary region are set based on the received CPICH quality measurements from the wireless communication units, and the number of cell-subscribed wireless communication units in the boundary region is calculated. The wireless communication units may then be instructed to inform of when CPICH quality levels cross boundary region thresholds, in step 525.

Next, in step 530, if a wireless communication unit present within the cell, but not previously within the boundary region, reports a CPICH quality level crossing the inner threshold (thereby indicating that the wireless communication unit has moved into the boundary region), the method moves to step 535, where the number of wireless communication units in the boundary region is updated to include the wireless communication unit from which the report was received. The method then loops back to step 530.

If no report is received from a wireless communication unit in step 530, the method moves on to step 540, where it is determined whether a wireless communication unit present within the cell reports a CPICH quality level crossing the outer threshold (thereby indicating that the wireless communication is moving out of range of the coverage area of the cell).

If such a report has been received, the method moves to step 545, where it is determined whether the CPICH transmit power is at its maximum allowable level. If the CPICH transmit power is not at its maximum allowable level, the method loops back to step 520, where the CPICH power level is increased. However, if the CPICH transmit power is at its maximum allowable level, the method moves to step 550, and the wireless communication unit, from which the report indicating a CPICH quality level crossing the outer threshold was received, is considered to have left the communication cell. The method then loops back to step 515.

Referring back to step 540, if a report has not been received, which indicates that a wireless communication is moving out of range of the coverage area of the cell, the method moves on to step 555. In step 555, it is determined whether a wireless communication unit previously present within the boundary region reports a CPICH quality level crossing the inner threshold (thereby indicating that the wireless communication is moving nearer, out of the boundary region).

If such a report has been received, the method moves to step 560, where it is determined whether the wireless communication unit from which the report was received was the last wireless communication unit in the boundary region. If the wireless communication unit was the last in the boundary region, the method loops back to step 520, where the CPICH power level and boundary region are reduced. However, if the wireless communication unit was not the last in the boundary region, the method loops back to step 535, and the number of wireless communication units in the boundary region is updated to exclude the wireless communication unit from which the report was received.

Referring back to step 555, if no wireless communication unit previously present within the boundary region has reported a CPICH quality level crossing the inner threshold, the method moves on to step 565, where it is determined whether all wireless communication units that have been subscribed to the cell are present within the cell. If all subscribed wireless communication units are present within the cell, the method loops back to step 530. However, if not all subscribed wireless communication units are present within the cell, the method moves to step 570, where it is determined whether one or more detection criteria have been met. For example, such detection mode criteria may comprise one or more of the following events occurring:

(i) Expiration of a period of time since a previous detection mode instance;

(ii) A time of day; or (iii) The occurrence of one or more predefined events, such as detecting a considerable rise of RoT at the femto AP, such a rise of RoT potentially indicating the arrival of a wireless communication unit with ongoing calls (through outdoor macro networks), etc.

If one or more detection mode criteria have not been met, the method moves to step 575, where it is determined whether any new cell-subscribed wireless communication units have been detected. For example, a wireless communication unit may be detected upon receipt of a location update request there from. If no new cell-subscribed wireless communication units have been detected, the method loops back to step 530. However, if a new cell-subscribed wireless communication unit has been detected, the method loops back to step 520.

Referring back to step 570, if it is determined that one or more detection mode criteria have been met, the method moves on to step 610 (of FIG. 6).

Referring now to FIG. 6, in step 610, a detection mode is initiated and the CPICH power level is increased to a detection level. The method then waits, in step 620, for a sufficiently long period of time for a wireless communication unit to at least detect the CPICH, synchronise with the transmissions from the femto AP on the synchronisation channel for the cell, and request a connection to be established with the cell.

Next, the method moves to step 630 where it is determined whether any new wireless communication units have been detected in step 630. If no new wireless communication units have been detected, the method moves to step 640, where the CPICH power level is reduced to its previous level, prior to entering detection mode. The method then loops back to step 530 (of FIG. 5).

Referring back to step 630, if it is determined that one or more cell-subscribed wireless communication units have been detected, the method moves to step 650, where the CPICH power level and the boundary region are set based on received quality measurements, for example from both newly detected and already present wireless communication units, and the number of cell-subscribed wireless communication units in the boundary region is calculated. As previously mentioned, cell-subscribed wireless communication units entering the cell will transmit CPICH quality measurements in response to the broadcasting of the requirement for such in step 510. The method may then move to step 660, where the newly detected wireless communication units are instructed to inform of when CPICH quality levels cross boundary region thresholds, before looping back to step 530 (of FIG. 5).

Referring back to step 515 (of FIG. 5), if no cell-subscribed wireless communication units are present within the cell, the method moves to step 710 (of FIG. 7), where the CPICH power level is set to a minimum level.

Referring now to the flowchart of FIG. 7 in step 720, it is determined whether one or more detection mode criteria have been met. If no detection mode criterion has been met, the method loops back to step 710.

However in step 720, if one or more detection mode criteria have been met, the method moves on to step 730, where the CPICH power level is increased to a detection level. Next, in step 740, the method waits for a sufficiently long period of time for a wireless communication unit to at least detect the CPICH, synchronise with the transmission from the femto AP on the synchronisation channel for the cell, and request a connection to be established.

Next, in step 750, it is determined whether any new cell-subscribed wireless communication units have been detected. If no new wireless communication units have been detected in step 750, the method loops back to step 710. However, if a new cell-subscribed wireless communication unit has been detected in step 750, the method moves on to step 760. In step 760, the CPICH power level and the boundary region are set based on received quality measurements from the wireless communication unit(s), and the number of cell-subscribed wireless communication units in the boundary region is calculated. As previously mentioned, cell-subscribed wireless communication units entering the cell will transmit CPICH quality measurements, in response to the broadcasting of the requirement for such in step 510. The method then moves to step 770, where the newly detected wireless communication units are instructed to inform of when CPICH quality levels cross boundary region thresholds. The method then moves to step 530 (of FIG. 5).

Referring back to FIG. 1, and as previously mentioned, due to the problem of interference caused by femto cells to, for example, overlapping/neighbouring macro cells, it is desirable to keep the overall available transmission power of the femto AP to a minimum level. As a result, femto APs have typically a limited amount of power available for use for physical channel transmissions. When a large number of users require services from the femto AP, the power available for providing each service can become significantly low, thereby affecting the quality of service that is provided to the UEs.

For example, the signal processing logic module 165 of the AP may be arranged to determine a total available transmit power level (Ttl_Pwr) for the femto cell 150. Such a total available transmit power level may be typically set to avoid unacceptably high interference, for example based on a Network Operator policy or the like. Accordingly, the total available transmit power level may be determined by looking up a value stored in memory. A proportion of the total available transmit power (Ovrhead_Pwr) may be allocated to common control channels (excluding the CPICH), say in a region of 10%. Typically, for known base stations, the CPICH transmit power (CPICH_Pwr) may comprise, for example, up to a further 10% of the total available transmit power, with the remainder of the total power available (Srvc_Pwr_Ttl), say approximately 80%, being available for services. This may be summarised as follows:

$$Ttl\_Pwr = Ovrhead\_Pwr + CPICH\_Pwr + Srvc\_Pwr\_Ttl \quad [Eq. 1]$$

In this manner, where there are a plurality of wireless communication units subscribed to the femto cell, the power available for services (Srvc_Pwr_Ttl) may be divided evenly between the cell-subscribed wireless communication units that may use the service, in order to provide fairness. Thus, the maximum available transmit power per user service (Srvc_Pwr_PUsr) equals the total power available for services (Srvc_Pwr_Ttl) divided by the number of subscribed wireless communication units that may use the service (Num_Usr). This may be summarised as follows:

$$Srvc\_Pwr\_PUsr = Srvc\_Pwr\_Ttl/Num\_Usr \quad [Eq. 2]$$

As will be appreciated by a skilled artisan, the more wireless communication units that are using the femto cell simultaneously, the less power there will be available for each user service. Furthermore, the maximum number of wireless communication units that are using the femto cell simultaneously cannot exceed the number of subscribed wireless communication units. Thus, it is advantageous to take account of the number of subscribed wireless communication units when determining the amount of power to be allocated for services.

To clarify, taking as an example the scenario of a femto cell comprising a total available transmit power level (Ttl_Pwr) limited to, say, 2.3 mW (for interference reasons). Suppose that the femto cell is required to comprise a radius of 18 metres, for example to provide coverage through the AP owner's home. To provide such a coverage area, the CPICH is required to be transmitted at, say, 0.15 mW (CPICH_Pwr), approximately 6.5% of total available transmit power level (Ttl_Pwr), with a further 0.15 mW for other common channels (Ovrhead_Pwr). Accordingly, the total power available for services (Srvc_Pwr_Ttl) is approximately 2 mW. In the event that the most power hungry services require 2 mW in order to achieve a desired quality of service at the 18 metre radius cell boundary, then as long as only one user requires this service, there is sufficient power available to provide the service throughout the cell. That is to say, whilst the number of cell-subscribed wireless communication units (Num_Usr) is no greater than one, the maximum available power level per user service (Srvc_Pwr_PUsr) may equal the total power available for services (Srvc_Pwr_Ttl), namely for the given example 2 mW, which is sufficient to provide the most power hungry service throughout the 18 metre radius cell.

Now, suppose a second wireless communication unit is subscribed to, or registered with, the femto cell. In order for the most power hungry service to be provided simultaneously throughout the 18 metre radius cell to both cell subscribed wireless communication units, 2*2 mW would be required, on top of the 0.3 mW required for the CPICH and other common channels; a total of 4.3 mW. Since the total available transmit power level (Ttl_Pwr) is limited to only 2.3 mW, this is not feasible.

As previously mentioned, the maximum available power level per user service (Srvc_Pwr_PUsr) is dependent on the total power available for services (Srvc_Pwr_Ttl) and the number of subscribed wireless communication units (Num_Usr). Accordingly, the maximum available power level per user service (Srvc_Pwr_PUsr) may be determined using Equation 2 (Eq. 2) above as follows:

$$Srvc\_Pwr\_PUsr = 2\ mW/2 = 1\ mW \quad [Eq. 3]$$

As will be appreciated by a skilled artisan, by reducing the transmit power for service, the range over which the desired quality of service is achieved is reduced. For the above example, by reducing the available power level per user service (Srvc_Pwr_PUsr) from 2 mW to 1 mW, the radius of the area within which the desired quality of service is achieved may be reduced from 18 metres to, say, approximately 14.3 metres. As a result, whilst a cell-subscribed wireless communication device is within the reduced radius, it will receive a required quality of service. However, when the wireless communication unit moves beyond the 14.3 metre radius, the quality of service drops to an unacceptably low level, even though the wireless communication unit may still be within the 18 metre radius of the cell, and still clearly receiving the CPICH.

Thus, and in accordance with an embodiment of the invention, the signal processing logic module 165 of AP 130 may be arranged to determine a CPICH transmit power level based on a maximum available power level per user service (Srvc_Pwr_PUsr). In this manner, the signal processing logic module 165 is able to adapt the CPICH transmit power to take into account the quality of services provided to cell subscribed wireless communication units.

In particular, and in accordance with an embodiment of the invention, the signal processing logic module 165 may be arranged to determine the CPICH transmit power level according to a range associated to provision of user services, determined by the available power per user. For example, let us take the case described above where the available power level per user service (Srvc_Pwr_PUsr) is reduced from 2 mW to 1 mW, causing the radius of the area within which the desired quality of service is achieved to be reduced from 18 metres to, say, approximately 14.3 metres. The signal processing logic module 165 of the AP 130 may determine a radius of the area within which the desired quality of service is achieved, for example from a lookup table (not shown) or by calculation, and reduce both the CPICH transmit power and the transmit power used for other common channels from the 0.15 mW each required for an 18 metre radius coverage area to, say, 0.075 mW each which is all that is required for the 14.3 metre radius (for example as defined within the same or a further lookup table).

In this manner, the effective cell coverage is also reduced to a 14.3 metre radius. Accordingly, the most power hungry service may be provided simultaneously throughout the cell to both cell subscribed wireless communication units, without exceeding the total available transmit power level (Ttl_Pwr), and therefore without increasing the interference to neighbouring cells. In fact, by reducing the CPICH transmit power and the transmit power for other common channels from 0.15 mW each to 0.075 mW each, a reduction of 6.5% of the total available transmit power level (Ttl_Pwr), the interference caused by the femto cell is actually reduced.

In accordance with some alternative embodiments, the 6.5% saving in transmit power may be allocated partly to increasing the CPICH and common channel transmit power, and partly to increasing power for user services. In this manner, the reduction in interference may be traded for a slightly increased coverage area.

Alternatively, the femto AP may be configured with the types of services that each cell-subscribed wireless communication unit is allowed to use. For example, there may be two cell-subscribed wireless communication units. In such an embodiment, both cell-subscribed wireless communication units are allowed to make voice calls (which require relatively low power levels), whilst only one is allowed to use a high data rate packet service (which requires a relatively large amount of power). The femto AP may then determine the cell radius at which the most power hungry services allowed for each cell-subscribed wireless communication unit could be supported simultaneously, and determine the CPICH transmit power level (and transmit power levels for other common channels) required for this cell radius. This would result in a larger coverage area than a case where it is assumed that all cell-subscribed wireless communication unit might require the most power hungry service simultaneously, without increasing the interference caused to neighbouring cells.

In accordance with an embodiment of the invention, the signal processing logic module 165 of the AP 130 may be arranged to determine the CPICH transmit power level based on the maximum available power level per user service when operating in a detection mode as described above.

Figure 8:
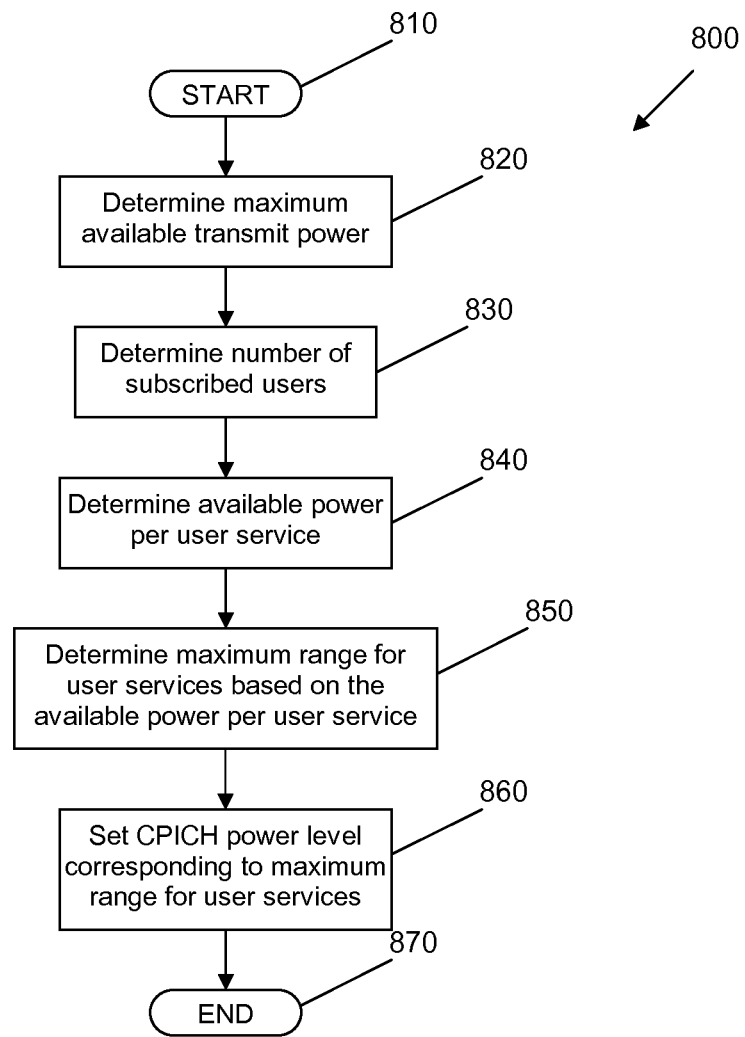
FIG. 8 illustrates an example of a simplified flowchart of a method for setting a transmit power level of a Common Pilot Channel (CPICH) for a femto cell of a cellular communication network according to an alternative embodiment of the invention.

Referring now to FIG. 8, there is illustrated an example of a simplified flowchart 800 of a method for setting a transmit power level of a CPICH for a femto cell of a cellular communication network according to an embodiment of the invention.

The method starts at step 810, and proceeds to step 820 where a maximum available transmit power is determined. Next, in step 830, the number of cell-subscribed users is determined, before determining the available power per user service in step 840. The method then moves on to step 850, where a maximum range for services is determined based on the available power per user service. Next, in step 860, the CPICH power level is set, such that the cell range substantially corresponds with the maximum range for user services. The method then ends at step 870

Figure 9:
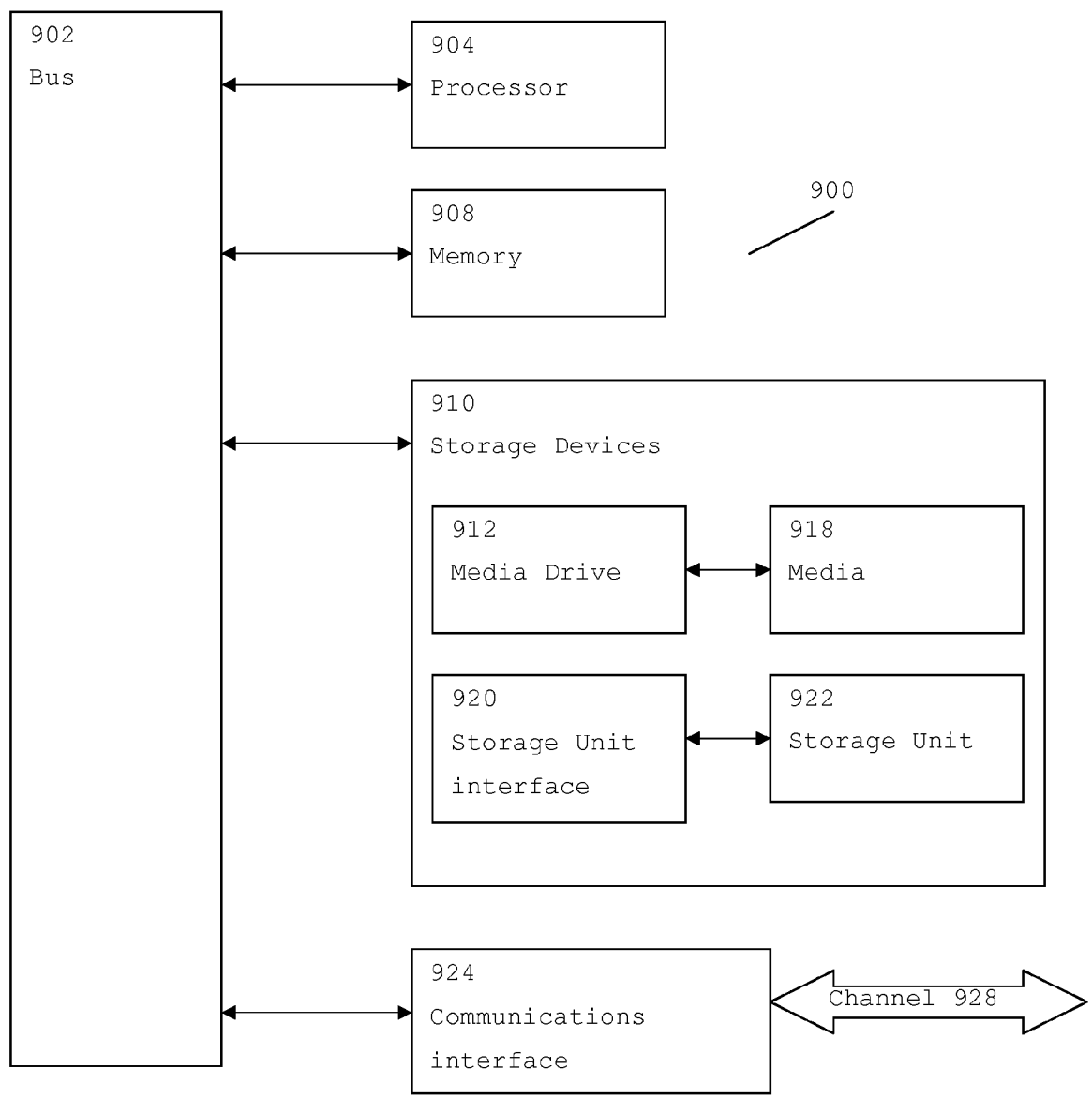
FIG. 9 illustrates a typical computing system that may be employed to implement signal processing functionality in embodiments of the invention.

Referring now to FIG. 9, there is illustrated a typical computing system 900 that may be employed to implement signal processing functionality in embodiments of the invention. Computing systems of this type may be used in access points and wireless communication units. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special-purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having particular computer software or data stored therein.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 922 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc. Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage unit 922, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional elements and processors. However, it will be apparent that any suitable distribution of functionality between different functional elements or processors, for example with respect to a base station or controller, may be used without detracting from the invention. For example, it is envisaged that functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention describes an AP for a UMTS network, it is envisaged that the inventive concept is not restricted to this embodiment.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Moreover, an embodiment can be implemented as a computer-readable storage element having computer readable code stored thereon for programming a computer (e.g., comprising a signal processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

It will be appreciated that the accompanying drawings are intended for illustration purposes only, and generally show simplified representations of the various features, components, etc. described therein. By way of example, FIGS. 1 to 4 illustrate cells that comprise generally circular or elliptical coverage areas. However, as will be appreciated by a skilled artisan, the coverage area of a cell may vary based on structures and the like therein. For example, in the case of a femto cell, the general shape and size of the coverage area may typically vary depending on the size and shape of rooms, the location of walls, etc.

Thus, a method and apparatus for setting a transmit power level of a Common Pilot CHannel (CPICH) for a femto cell of a cellular communication network have been described, which substantially addresses at least some of the shortcomings of past and present techniques and/or mechanisms for setting a transmit power level of a Common Pilot CHannel (CPICH).

The invention claimed is:

1. An access point for supporting communication in a femto cell of a cellular communication network, the access point comprising:
   transceiver circuitry arranged to enable communication with at least one cell-subscribed wireless communication unit located within the femto cell, and
   signal processing logic module,
   wherein the signal processing logic module is arranged to:
      determine a number of cell-subscribed wireless communication units that are identified as having been registered with the femto cell and authorised to access being allowed to use a user service provided in the femto cell;
      determine a number of those identified cell-subscribed wireless communication units that are present within the femto cell, and
      configure a transmit power level of a Common Pilot Channel (CPICH) for transmission based thereon.

2. The access point of claim 1 wherein the signal processing logic module is further arranged to configure the transmit power level of the CPICH based additionally on CPICH quality measurements received from at least one cell subscribed wireless communication unit located within the femto cell.

3. The access point of claim 2 wherein the signal processing logic module is further arranged to instruct cell-subscribed wireless communication units within the femto cell to report CPICH quality measurements to the signal processing logic module, and upon receipt of CPICH quality measurements from at least one cell subscribed wireless communication unit, to configure the transmit power level of the CPICH based on the received CPICH quality measurements.

4. The access point of claim 2 wherein the signal processing logic module is arranged to determine a cell subscribed wireless communication unit coverage area based on the received CPICH quality measurements, and to configure the transmit power level of the CPICH to correspond to the determined cell-subscribed wireless communication unit coverage area.

5. The access point of claim 2 wherein the signal processing logic module is further arranged to instruct cell-subscribed wireless communication units within the femto cell to inform the signal processing logic module when a CPICH quality measurement passes a threshold of a boundary region, and upon being informed by a cell-subscribed wireless communication unit of the CPICH quality measurement passing the threshold, the transmit power level of the CPICH is reconfigured.

6. The access point of claim 2 wherein the signal processing logic module is further arranged to determine whether at least one cell-subscribed wireless communication unit is not present within the femto cell, and upon determination that the at least one cell-subscribed wireless communication unit is not present within the femto cell, to temporarily enter a detection mode of operation.

7. The access point of claim 6 wherein the signal processing logic module performs an increase of the transmit power level of the CPICH upon at least one detection mode criterion being met.

8. The access point of claim 6 wherein the detection mode criteria comprise at least one from a group of:
   expiration of a period of time since a previous detection mode instance;
   a time of day;
   the detection of an increase in Rise over Thermal noise; or
   an occurrence of at least one other event.

9. The access point of claim 6 wherein, if it is determined that no cell subscribed wireless communication unit is present within the femto cell, the signal processing logic module is arranged to configure the transmit power level of the CPICH to a minimum level.

10. The access point of claim 9 wherein the signal processing logic module increases the transmit power level of the CPICH upon at least one detection mode criterion being met.

11. The access point of claim 6 wherein the signal processing logic module is arranged, upon entering the detection mode, to set the transmit power level to a maximum CPICH transmit power level.

12. The access point of claim 6 wherein if a cell-subscribed wireless communication unit has not been present within the femto cell for a period of time, the signal processing logic module is further arranged to consider that wireless communication unit as outside of a coverage area, and in response thereto not take the cell-subscribed wireless communication unit into consideration when determining whether at least one cell-subscribed wireless communication unit is not present within the femto cell.

13. The access point of claim 2 wherein, upon a previously absent cell-subscribed wireless communication unit being detected within the femto cell, the signal processing logic module is arranged to instruct the detected cell-subscribed wireless communication unit to report CPICH quality measurements to the signal processing logic module.

14. The access point of claim 13 wherein the signal processing logic module, upon receipt of CPICH measurements from the detected cell subscribed wireless communication unit, is arranged to configure the transmit power level of the CPICH taking into account the CPICH measurements received from the detected cell subscribed wireless communication unit.

15. The access point of claim 1 wherein the signal processing logic module is arranged to determine a CPICH transmit power level based at least in part on a maximum available power level per user service.

16. The access point of claim 15 wherein the signal processing logic module is arranged to determine the CPICH transmit power level according to a user service range determined by an available power per user service.

17. The access point of claim 1 wherein the signal processing logic module is arranged to determine a CPICH transmit power level based at least in part on a number of cell-subscribed wireless communication units that are identified as being allowed to use the user service that requires a greatest amount of transmit power.

18. A method for setting a transmit power level of a Common Pilot Channel (CPICH), for a femto cell of a cellular communication network, the method comprising:
   determining a number of cell-subscribed wireless communication units that are identified as having been registered with the femto cell and authorised to access being allowed to use a user service provided in the femto cell;

determining a number of those identified cell-subscribed wireless communication units that are present within the femto cell, configuring a transmit power level of the CPICH based at least on the number of present cell-subscribed wireless communication unit allowed to use the user service; and transmitting the CPICH at the determined transmit power level.

19. The method of claim 18 further comprising configuring the transmit power level of the CPICH based on CPICH quality measurements received from at least one cell-subscribed wireless communication unit within the femto cell.

20. A wireless communication system adapted to support the method for setting a transmit power level of a Common Pilot Channel (CPICH) for a femto cell of a cellular communication network of claim 18.

21. An integrated circuit for an access point to support communication in a femto cell of a cellular communication network, the integrated circuit comprising a signal processing logic module arranged to:

determine a number of cell-subscribed wireless communication units that are identified as having been registered with the femto cell and authorised to access being allowed to use a user service provided in the femto cell determine a number of those identified cell-subscribed wireless communication units that are present within the femto cell; and configure a transmit power level of a Common Pilot Channel (CPICH) for transmission based thereon.

22. A computer-readable storage element having computer-readable code stored thereon for supporting communication in a femto cell of a cellular communication network, the code operable for at an access point:

determining a number of cell-subscribed wireless communication units that are identified as having been registered with the femto cell and authorised to access being allowed to use a user service provided in the femto cell;

determining a number of those identified cell-subscribed wireless communication units that are present within the femto cell, configuring a transmit power level of a Common Pilot Channel (CPICH) in the femto cell, based at least on the number of present cell-subscribed wireless communication units allowed to use the user service; and transmitting the CPICH at the transmit power level.

23. The computer-readable storage element of claim 22, wherein the computer readable storage medium comprises at least one from a group consisting of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory.

* * * * *

UNITED STATES PATENT AND TRADEMARK OFFICE
CERTIFICATE OF CORRECTION

PATENT NO. : 8,666,422 B2
APPLICATION NO. : 13/121365
DATED : March 4, 2014
INVENTOR(S) : Yajian Liu et al.

It is certified that error appears in the above-identified patent and that said Letters Patent is hereby corrected as shown below:

IN THE CLAIMS:

Column 19, Claim 1, Line 20: Insert -- a -- before "transceiver";
Column 19, Claim 1, Line 22: Change "cell," to -- cell; --;
Column 19, Claim 1, Line 23: Insert -- a -- before "signal";
Column 19, Claim 1, Line 23: Change "module," to -- module --;
Column 19, Claim 1, Line 32: Change "cell," to -- cell; --;
Column 19, Claim 2, Line 38: Change "cell subscribed" to -- cell-subscribed --;
Column 19, Claim 3, Line 45: Change "cell subscribed" to -- cell-subscribed --;
Column 19, Claim 4, Line 49: Change "cell subscribed" to -- cell-subscribed --;
Column 19, Claim 5, Line 56: After "instruct" insert -- the --;
Column 19, Claim 5, Line 58: Change "a" to -- the --;
Column 19, Claim 6, Line 67: After "that" delete "the";
Column 20, Claim 6, Line 1: Change "cell subscribed" to -- cell-subscribed --;
Column 20, Claim 8, Line 8: Change "claim 6" to -- claim 7 --;
Column 20, Claim 8, Line 8: After "the" insert -- at least one --;
Column 20, Claim 8, Line 9: Change "criteria comprise" to -- criterion comprises --;
Column 20, Claim 8, Line 9: After "one" insert -- selected --;
Column 20, Claim 8, Line 9: Change "a" to -- the --;
Column 20, Claim 8, Line 9: After "group" insert -- consisting --;
Column 20, Claim 8, Line 13: Change "the" to -- a --;
Column 20, Claim 8, Line 13: Change "or" to -- and --;
Column 20, Claim 9, Line 16: Change "cell subscribed" to -- cell-subscribed --;
Column 20, Claim 12, Line 27: Change "wherein" to -- wherein, --;
Column 20, Claim 12, Line 30: Change "that" to -- the cell-subscribed --;
Column 20, Claim 13, Line 40: After "report" insert -- the --;
Column 20, Claim 14, Line 43: After "of" insert -- the --;
Column 20, Claim 14, Line 43: Change "cell subscribed" to -- cell-subscribed --;
Column 20, Claim 18, Line 64: Change "(CPICH)," to -- (CPICH) --;

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,666,422 B2

IN THE CLAIMS:

Column 21, Claim 18, Line 5: Change "cell," to -- cell; --;
Column 21, Claim 18, Line 6: Change "a" to -- the --;
Column 21, Claim 18, Line 8: Change "unit" to -- units --;
Column 21, Claim 20, Line 15: Change "setting a" to -- setting the --;
Column 21, Claim 20, Line 15: Change "of a" to -- of the --;
Column 21, Claim 20, Line 16: Change "for a" to -- for the --;
Column 21, Claim 20, Line 16: Change "of a" to -- of the --;
Column 21, Claim 21, Line 26: After "of" delete "those";
Column 22, Claim 22, Line 14: Change "cell," to -- cell; --;
Column 22, Claim 23, Line 22: Change "one" to -- one selected --;
Column 22, Claim 23, Line 22: Change "from a" to -- from the --.